US005742990A

United States Patent [19]

Antonucci

[11] Patent Number: 5,742,990

[45] Date of Patent: Apr. 28, 1998

[54] FLEXIBLE DRAW LATCH ASSEMBLY METHOD

[75] Inventor: Jeffrey L. Antonucci, King of Prussia, Pa.

[73] Assignee: Southco, Inc., Concordville, Pa.

[21] Appl. No.: 743,707

[22] Filed: Nov. 6, 1996

Related U.S. Application Data

[62] Division of Ser. No. 517,576, Aug. 21, 1995, Pat. No. 5,607,195.

[51] Int. Cl.$^6$ .......... B23P 11/00

[52] U.S. Cl. .......... 29/434; 29/450; 29/525

[58] Field of Search .......... 29/11, 434, 436, 29/450, 525, 525.08

[56] References Cited

U.S. PATENT DOCUMENTS

| | | |
|---|---|---|
| D. 324,165 | 2/1992 | Bressler et al. . |
| D. 333,775 | 3/1993 | Krape . |
| 1,400,953 | 12/1921 | Hennicke . |
| 1,406,090 | 2/1922 | Schermuly . |
| 1,489,648 | 4/1924 | Schmidt . |
| 3,618,995 | 11/1971 | McLean . |
| 3,892,434 | 7/1975 | Caldwell . |
| 3,985,380 | 10/1976 | Raivio . |
| 4,049,301 | 9/1977 | Schenk . |
| 4,184,705 | 1/1980 | Little . |
| 4,218,081 | 8/1980 | Johnson . |
| 4,540,206 | 9/1985 | Frame et al. . |
| 4,801,165 | 1/1989 | Pyle . |
| 4,804,215 | 2/1989 | Bisbing . |
| 4,828,298 | 5/1989 | Bisbing . |
| 4,830,413 | 5/1989 | Bisbing . |
| 5,007,155 | 4/1991 | Jordan .......... 29/434 |
| 5,103,533 | 4/1992 | Pettit et al. . |

FOREIGN PATENT DOCUMENTS

| | | |
|---|---|---|
| 1114621 | 12/1965 | United Kingdom . |

OTHER PUBLICATIONS

Southco Handbook p. 45 (Southco, Inc.) Concordville, PA, 1995, pp. H-7, H-30.

*Primary Examiner*—David P. Bryant
*Attorney, Agent, or Firm*—Paul & Paul

[57] ABSTRACT

A flexible over-center draw latch is disclosed which is adapted for securing together two closure members. The latch comprises a keeper mounted on the one closure member and a latch assembly mounted on the other closure member. The latch assembly includes a base which is adapted to be mounted on the second closure member, a substantially elastic latch body pivotally connected to the base and a lever which is pivotally connected to the latch body. As the latch is fastened, the lever engages the keeper to secure the panels together. The substantially elastic body member becomes elongated along its longitudinal axis as the latch is fastened. The loads which are produced by the latch body as it is elongated are distributed over the latch which ensures the connection of the components. The latch assembly also provides reinforced connection between the latch body with the base and the lever. The latch also provides a more secured fastened position due to engagement of the lever and the keeper.

2 Claims, 3 Drawing Sheets

FLEXIBLE DRAW LATCH ASSEMBLY METHOD

CROSS-REFERENCE TO RELATED APPLICATIONS

This application is a division of U.S. patent application Ser. No. 08/517,576 filed Aug. 21, 1995, now U.S. Pat. No. 5,607,195.

BACKGROUND OF THE INVENTION

1. Field of the Invention

The present invention relates generally to over-center draw latches for use in securing together two closure members and more particularly to over-center draw latches of the flexible or elastic type.

2. Brief Description of the Prior Art

Many types of over-center draw latches are known. Such latches essentially comprise a keeper, a mounting bracket, a lever and a catch, with the catch being adapted to engage the keeper in the secured position of the latch. Typically, such latches are of a molded plastic or metal construction or, in some instances, a combination of both plastic and metal. These varieties of latches often are considered desirable because they provide positive over-center latching in relation to the closure members to which they are attached. A disadvantage in these latches, however, is the fact that considerable precision is required in the location and alignment of the closure members and in the installation of the latch in order to ensure proper latching operation. Specifically, on installation, the bracket and keeper members are required to be positioned aligned to one another so as to allow engagement between the catch and keeper during latching. In a similar regard, another disadvantage is that such latches are incapable of operating in applications where it is required that one closure member move relative to the other, such as where relative vibration of the closure members will occur.

Flexible draw latches are another type of over-center draw latch known in the art and have been used for many years. Essentially, a flexible draw latch includes a base, a latch body comprising a rubber stretch arm or other suitable flexible material affixed to the base, a lever and a keeper. Some examples of flexible draw latches are shown in U.S. Pat. Nos. 4,830,413, issued May 16, 1989; U.S. Pat. No. 4,828,298, issued May 9, 1989 and U.S. Pat. No. 4,804,215, issued Feb. 14, 1989, which are all assigned to Southco, Inc., the assignee of the present application. The complete disclosures of these patents are incorporated herein by reference. Typically, flexible draw latches are used to secure loose fitting hoods or covers on heavy machinery or mechanical equipment. In operation the rubber stretch arm is pulled up and into engagement with the keeper through rotation of the lever, with the elasticity of the rubber arm operating to keep the hood or cover secure. Generally, these types of latches are considered desirable because the flexibility of the rubber arm will compensate for misalignment of the bracket and keeper which may result in the location and alignment of the closure members and during installation. Furthermore, the flexibility of these latches also permit the closure members to move relative to one another without causing the latch to release or otherwise become inoperative, thus being desirable for use in situations where vibrations of the closure members relative to one another do occur. Another advantage of these flexible draw latches is that the load capability of the latch can be varied, within a range, by simply increasing or decreasing the distance between the bracket and the keeper and, thus, the tension on the rubber stretch arm. Despite these foregoing advantages, there are certain drawbacks to the operation of prior art flexible draw latches. One known problem is in the manner in which the components of the flexible draw latches are connected. For instance, the entire load which is produced as the latch body is stretched during operation is transmitted through to the base and lever and can over stress the connection of these members. Furthermore, another problem observed due to the characteristics of the latch body occurs at the point of connection with the base and lever. In particular, where the latch body is connected to the base and lever by a pivot pin, the most common type of failure that has been found to occur results in a split forming in the latch body which allows it to detach from the base or lever. Specifically, in latches of this type, the pivot pins are secured through holes passing through the latch body which in turn are connected with the base and lever, and a split forming proximate any one of the holes in the latch body allows the latch to come apart at that point. In addition, another similar problem is that the pivot pins are often times not securely retained within the latch structure and also require additional tools or equipment to install.

Because of these and other shortcomings associated with flexible draw latches presently employed, there now exists a need for an improved flexible draw latch which overcome the deficiencies of the prior art.

SUMMARY OF THE INVENTION

The present invention provides a novel flexible draw latch and method of assembling a flexible draw latch. For this purpose, the present invention provides a draw latch that is adapted for use in securing together a first closure member and a second closure member. The draw latch according to the present invention includes a keeper which is adapted for being affixed to the first closure member. A latch assembly is also included and is adapted for being affixed to the second closure member. The latch assembly includes a base which operates to affix the latch assembly to the second closure member and a substantially elastic latch body which is pivotally connected to the base. The latch assembly also includes a lever pivotally connected to the latch body. The lever is adapted for engaging the keeper for securing together the first and second closure members.

In accordance with the present invention, an object is to provide a novel flexible over-center draw latch.

It is another object of the present invention to provide a flexible draw latch having improved connection of its components.

Another object of the present invention to provide a flexible draw latch which is capable of distributing the load produced by the latch body.

It is still another object of the present invention to provide a flexible draw latch in which the parts are few and which provides a secure latching operation and is versatile in application.

These and other objects of the present invention will become more readily apparent when taken into consideration with the following description and the attached drawings.

DETAILED DESCRIPTION OF THE PREFERRED EMBODIMENTS

Figure 1:
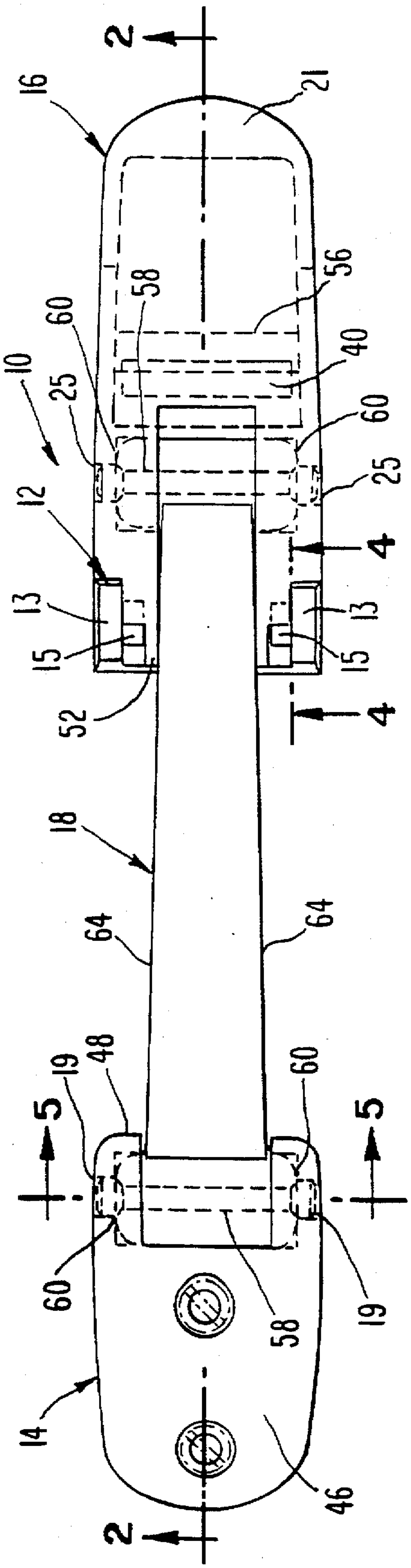
FIG. 1 is a top plan view of a latch according to the present invention and shown in a closed and latched position.
Figure 2:
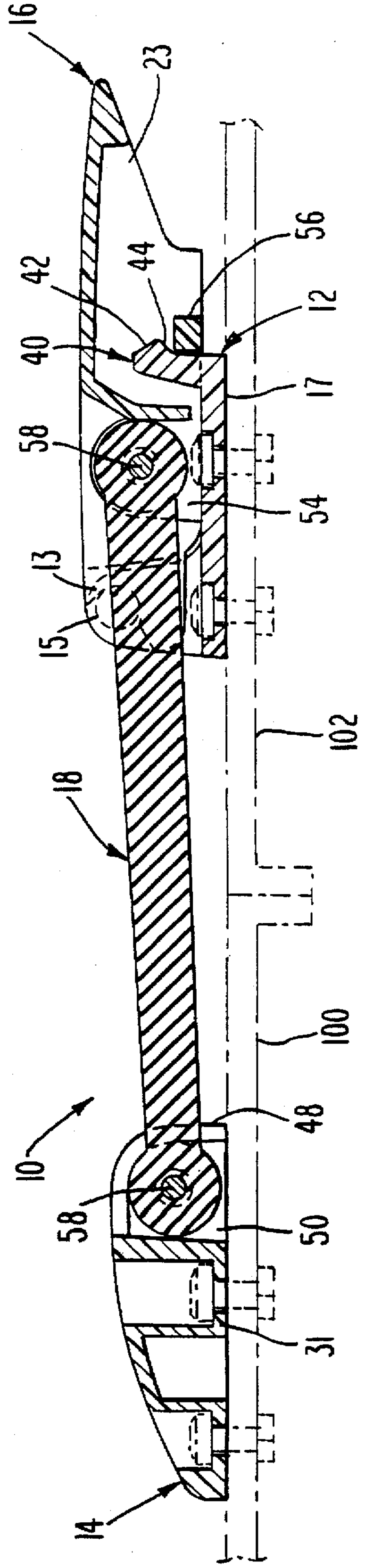
FIG. 2 is a sectional elevational view of the latch of FIG. 1 taken along the line 2—2.
Figure 3:
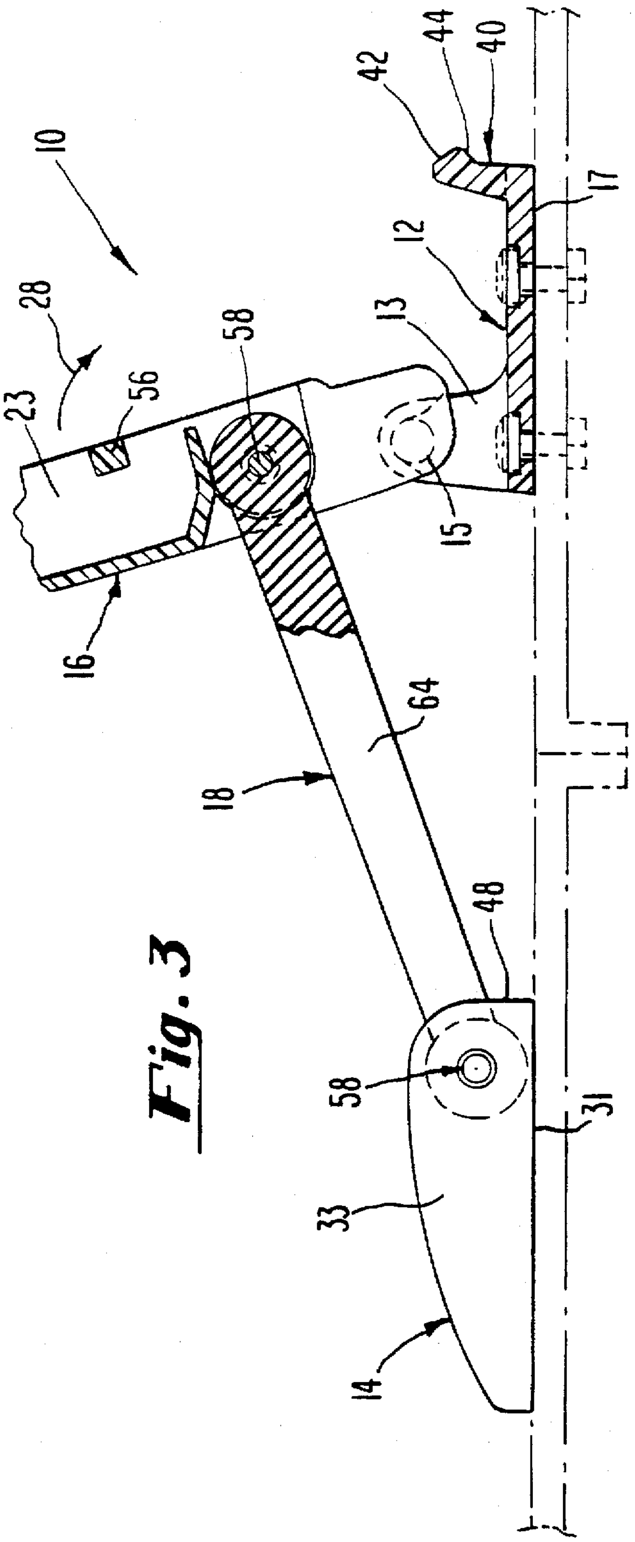
FIG. 3 is a perspective view of the latch of FIG. 1 shown in a closed and unlatched position.

Referring now to the drawings in detail, wherein like reference numerals indicate like elements throughout the several views, there is in FIG. 1 a top plan view of a flexible draw latch according to the present invention shown in a closed and latched position. The flexible draw latch 10 as illustrated in FIG. 1 is mounted on corresponding closure members 100 and 102, respectively, as is shown in section in FIG. 2. The latch 10 as illustrated includes, as portions thereof, a keeper 12 and a latch assembly comprising a base 14, a lever 16, and a substantially elastic latch body 18, preferably manufactured of an elastomeric material. As seen in FIGS. 1 through 3, the keeper 14 is adapted to be affixed to the closure member 102 while the latch assembly is adapted to be affixed to the closure member 100. The first and second closure members 100 and 102, respectively, according to the present invention can comprise doors, panels or similar that are manufactured from any suitable material and are adapted to engage one another in a closed position, such as that shown in FIGS. 2 and 3. One example is a hood used on various machinery, such as a hood cover on a truck.

The keeper 12, as seen in FIGS. 1 and 2, is preferably comprised of a bottom wall 17 and two spaced-apart opposing wall sections 13. The bottom wall 17 is preferably provided with a pair of spaced-apart apertures therein to facilitate the mounting within the closure member 102, such as by screws shown in FIG. 2 or other suitable fasteners. The opposing sidewalls 13 are each provided with a radiused upper end and a substantially annular boss 15 extending inward proximate the upper end for receiving the latch assembly as will be described below. Also extending upward from the bottom wall 17 is a generally elongated catch member 40 which includes proximate its upper end a camming surface 42 and a locking surface 44, which in combination are generally V-shaped in configuration. In the preferred embodiment, the keeper 12 is of a plastic molded construction.

The base 14, as shown in FIGS. 1–3, is included with a bottom wall 31 and two spaced-apart sidewalls 33 extending upward from the bottom wall 31. The base 14 also includes a top wall 46 connected both with the sidewalls 33 and a front wall 48, which in turn is connected with the sidewalls 33 and bottom wall 31. The bottom wall 31 is preferably provided with a pair of spaced-apart apertures therein in order to facilitate mounting of the base 14 to the closure member 100, such as by screws shown in FIG. 2 or other suitable fasteners. The bottom wall 31 is also provided with a substantially rectangular cavity 50 therein which terminates by a generally radiused surface opposite the top wall 46. The sidewalls 33 are also provided with a pair of substantially cylindrical spaced-apart apertures 19 therein to facilitate the pivotal connection with the latch body 18 as will be discussed below. Further, the top wall 46 and front wall 48 are each provided with correspondingly sized generally rectangular apertures therein which extend through to the cavity 50 formed in the bottom wall 31. In this embodiment, each of the generally rectangular cavities formed in the top wall 46 and front wall 48 are sized smaller than the size of the rectangular cavity 50 formed in the bottom wall 31 in the base 14. Further, as best illustrated in FIGS. 1 and 2, the apertures in the top wall 46 and front wall 48 connect which forms a generally L-shaped opening defined by these two members. In the preferred embodiment, preferably the base 14 is of a plastic molded construction.

Figure 4:
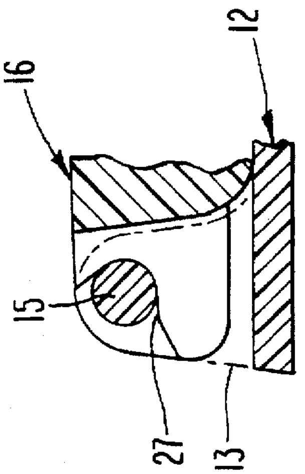
FIG. 4 is a sectional elevational view of the latch of FIG. 1 taken along the line 4—4.

The lever 16, as seen in the Figures, comprises a top wall 21 and a pair of spaced-apart opposing sidewalls 23. The sidewalls 23 preferably terminate by opposing inwardly stepped sections proximate its second end, and which include substantially radiused channels 27 therein which provide latching engagement with the bosses 15 of the keeper 12, as is shown in FIG. 4. The sidewalls 23 are further provided with a pair of substantially cylindrical opposing apertures 25 therein to facilitate pivotal mounting of the lever 16 to the latch body 18. Similar to the base 14, the lever 16 also includes a bottom wall which is connected to the side walls 23, and a front wall 52 connected with each of the side walls 23, the top wall 21 and bottom wall. In addition, provided through the bottom wall of the lever 16 is a substantially rectangular cavity 54 which terminates by a generally radiused surface opposite the top wall 21, which is similar to the cavity 50 in the base 14. Further, similar to the base 14, the lever 16 includes within its top wall 21 and front wall 52 adjoining generally rectangular shaped apertures which extend through to the cavity 54 in the bottom wall. However, a difference in the lever 16 from the base 14 is that the aperture provided through the top wall 21 is longer in diameter along its longitudinal axis which extends approximately ½ the distance of the lever 16. Further, adjacent the cavity 54 in the bottom wall, is a generally elongated rectangularly shaped connecting wall 56, which extends between and is connected to the side walls 23. As best illustrated in FIG. 2, the connecting wall 56 is surrounded by the front portion of the lever 16 proximate its first end defined by the two side walls 23 and the top wall 21. In the preferred embodiment, the lever 16 is of a plastic molded construction.

The latch body 18, as mentioned previously, is preferably made of an elastomeric material which exhibits sufficient stretch and recovery properties, such as EDPM rubber. As seen in FIGS. 1–3, the latch body 18 is preferably an elongated member having a pair of generally elongated end portions which are substantially perpendicular to and connected by a generally elongated middle portion. In particular, the end portions include opposing surfaces 60 at spaced separation which define a diameter of the end portions. Similarly, the middle portion includes opposing side surfaces 64 at spaced separation. In the present embodiment, preferably a diameter of the middle portion is less than the diameter of the end portions, which together define substantially T-shaped opposing ends of the latch body 18. In the preferred embodiment, the two end portions are each substantially cylindrical in cross section and provided with apertures therethrough for connection with the base 14 and lever 16, respectively, as will be described in detail below.

Further, as shown in FIG. 1, preferably the opposing surfaces 64 of the middle portion taper generally inward from the end portion within the base 14 to the opposing end portion within lever 16. Similarly, as shown in FIG. 2, preferably the upper and lower surfaces of the middle portion taper generally inward from the end portion within the lever 16 to the opposing end portion within the base 14. The result of this particular configuration of the latch body 18 is that the middle portion is of constant cross-section along its entire length. The advantage here is that there is a constant spring rate over the entire length of the middle portion of the latch body 18 which provides for even stretch during operation of the device. In an alternative arrangement of the present invention, the position of the latch body 18 can be reversed so that the connections with the base 14 and the lever 16 are exchanged, however, the same result noted above would still apply.

Figure 5:
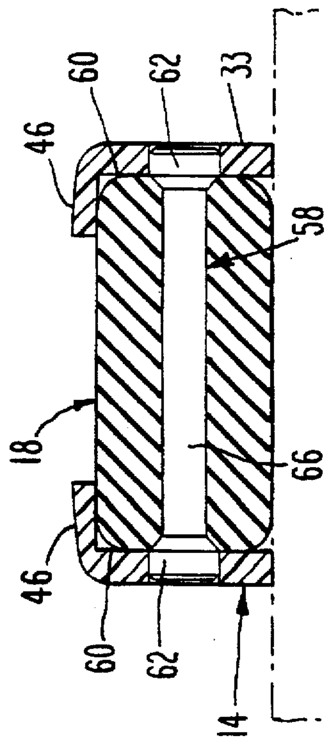
FIG. 5 is a sectional elevational view of the latch of FIG. 1. taken along the line 5—5.

In accordance with the present invention, a pair of generally elongated attachment members are provided for the connection of the latch body 18 with the base 14 and lever 16. Specifically, the attachment members extend through the apertures formed in the end portions of the latch body 18, and into each of the spaced-apart apertures 19 and 25 formed within base 14 and lever 16, respectively. In the present embodiment, preferably each of the generally elongated attachment members comprise a pin member 58 of a uniquely defined configuration which will hereinafter be described. However, it should be understood that this particular feature while preferred is not a requirement in the present invention. For instance, each of the generally elongated attachment members can be comprised of conventional pivot pin members already known in the art. However, in this embodiment, at least one, and preferably each of the generally elongated attachment members are configured corresponding to the pin members 58 illustrated in the figures. As best illustrated in FIG. 5, each of the pin members 58 are generally cylindrical in cross-section and include first and second areas 62 which are of specified diameters and proximate opposing ends, and a third area 66 between and of a diameter less than that of the first and second areas 62. Generally, each of the first and second areas 62 include outer walls proximate the side walls of the base 14 and lever 16, and inner walls adjacent the third area 66. Further, the outer walls of each of the first and second areas 62 are provided with substantially chamfered edges which surround the perimeter thereof. Similarly, the inner walls of each of the first and second areas 62 are included with substantially chamfered edges surrounding the perimeter which extend to meet the third area 66 of the pin member 58. The remaining portion of the first and second areas 62 between the substantially chamfered edges of the inner and outer walls are substantially constant in diameter. Similarly, the third area 66 of the pin member is generally elongated and of a substantially constant diameter along its longitudinal axis. In the present embodiment, preferably the composition of the pin members 58 are aluminum, however it should be understood that any other suitable materials can be used for this purpose, such as plastic.

As best illustrated in FIG. 1, the pin members 58 extend through each of the generally elongated end portions of the latch body 18 and terminate within the side walls of the base 14 and the lever 16, however, it should be understand that the pin members 58 can also extend out from the side walls of the base 14 and/or the lever 16. In the present embodiment, preferably the length of the pin members 58 along the longitudinal axis are greater than the diameter of the end portions of the latch body 18. Further, as best illustrated in FIG. 5, preferably the apertures formed within each of the end portions of the latch body 18 are configured to correspond with the configuration of the pin members 58. Specifically, in this embodiment, the apertures through the end portions define pin member apertures which include substantially chamfered surfaces proximate its terminating ends formed within the opposing surfaces 60 which receive the substantially chamfered portions of the inner walls of the first and second areas 62 of the pin members 58. In this embodiment, the diameter of the pin member apertures passing through each of the end portions of the latch body 18 are substantially the same size as the diameter of the third area 60 of pin members 58, however, this is not required. In particular, the diameter of the third area 60 can be larger or smaller than the diameter of the pin member apertures. As best illustrated in FIG. 1, the remaining portions of the first and second areas 62 of the pin members 58 which are not positioned within the pin member apertures are positioned within the apertures 19 and 25 within the side walls 33 and 23 of the base 14 and lever 16, respectively. In this manner, the pin members 58 are longitudinally fixed within the latch body 18 as will be described in further detail below. Preferably, the diameter of the apertures 19 and 25 are sized substantially corresponding to the diameter of the portion of the first and second areas 62 of the pin members 58 extending between the chamfered edges.

The assembly of the flexible draw latch 10 of the present invention will now be described. It should be understood, however, that the purpose of this illustration is to describe the particular relationship between each of the components of the present invention rather than the order of assembly, which can be accomplished in a number of different steps. In particular, upon assembly, the latch body 18 is either connected first with the base 14 or lever 16, however, for this illustration, the following will illustrate connection of the latch body 18 with the base 14 first, followed then by connection with the lever 16. Upon assembly with the base 14, one of the end portions of the latch body 18 is positioned so as to seat within the generally rectangular shaped cavity 50 provided therein. As best illustrated in FIG. 1, the shape and size of the end portion of the latch body 18 preferably substantially corresponds to the shape and size of the cavity 50 in the base 14, although this is not required. In this embodiment, the two opposing surfaces 60 of the end portion are positioned adjacent the side surfaces of the cavity 50, which are substantially parallel and opposite to the side walls 33. Further, as best illustrated in FIGS. 1 and 2, the portions of the cavity 50 opposite the top and front walls 46 and 48 are positioned adjacent the corresponding top and front areas of the end portion of the latch body 18. In this configuration, the apertures 19 through the side walls 33 are aligned with the pin member aperture passing through the generally elongated end portion of the latch body 18 in order to allow installation of the pin member 58. Upon installation of the pin member 58, the first area 62 is initially inserted within one of the apertures 19 and then press fit through the generally elongated end portion and into the second aperture 19 through the opposing side wall 33. Since the diameter of the first area 62 of the pin member is larger than the pin member aperture, the pin member aperture is stretched as a latched body swells around the first area 62. When the first area 62 finally completely is passed through the pin member aperture through the generally elongated end portion, the diameter of the pin member aperture again decreases and is positioned around the third area 62 of the pin member. Further, during installation, the chamfered edge of the outer wall of the first area 62 of the pin member facilitates its passage through the pin member aperture. As illustrated in FIGS. 1 and 5, when the pin member 58 reaches its fully installed position, the two larger diameter first and second areas 62 serve to retain the pin member within the latch body 18. This similar procedure would then be carried out for connecting the lever 16 to the latch body 18, however, for sake of brevity, this will not be described.

The operation of the latch 10 will now be described with reference to the sequential illustrations from a fully closed, latched position, as shown in FIGS. 1 and 2, through a fully opened, unlatched condition, as shown in FIG. 3. As the flexible draw latch 10 is moved between the closed and opened positions illustrated in the Figs., the first and second areas 62 of the pin members 58 serve as pivot points for the latch body 18 relative to the base 14 and the lever 16. Furthermore, the connection of the latch body 18 with the base 14 and lever 16 is reinforced by the relationship between the end portions of latch body 18 within the cavities 50 and 54. In particular, the end portions of the latch body 18 are positioned in engagement with the portions of the cavities 50 and 54 opposite the front walls 48 and 52, and top walls 46 and 21 of the base 14 and lever 16, which operates to further secure the engagement of these components.

In order to fasten the flexible draw latch 10, the latch is first brought into the position illustrated in FIG. 3, with the lever 16 positioned via its front channel portion 27 about the bosses 15 of the keeper 12. From the fully opened position of FIG. 3, the lever 16 is rotated in the direction of arrow 28 to the position illustrated in FIGS. 1 and 2. As the lever 16 undergoes its rotation to latch, the latch body 18 will initially stretch and then slightly contract as the latched position is reached due to the engagement of the lever 16 with the projecting boss portions 15 and the catch member 40 of the keeper 12, respectively. Specifically, the latch body 18 will initially stretch and then slightly contract due to the over-center action of the lever 16 as it is pivoted about the bosses 15 in the manner illustrated in FIG. 4 to the position shown in FIG. 2. Furthermore, the connecting wall 56 of the lever 16 will also come into contact with the catch member 40 as the lever 16 is rotated in the direction of arrow 28 to the closed position. As this occurs, the connecting wall 56 will initially come into contact with the camming surface 42 of the catch member 40 which will work to further stretch the latch body 18 as the connecting wall 56 moves along the inclined camming surface 42. In particular, the engagement of the connecting wall 56 with the camming surface 42 provides displacement of the lever 16 in a direction generally opposite the catch member 40, which in turn causes the latch body 18 to stretch. Thereafter, continued rotation of the lever 16 in the direction of arrow 28 will move the connecting wall 56 past the camming surface 42, and into a position proximate the locking surface 44 as best illustrated in FIG. 2. However, due to the tension provided by the latch body 18, the connecting wall 56 as it is moved past the camming surface 42 will be snapped into the position against the locking surface 44, producing an audible tone as this latched position is obtained. In this manner, an additional amount of elongation or stretch of the latch body 18 is required in order for the lever 16 to become disengaged with the keeper 12. Accordingly, the requirement to further stretch the latch body 18 in order to engage or disengage lever 16 with the keeper 12 provides for a more secure latched position. As to the composition of the latch body 18, the stretch characteristics must be such that the latch body 18 will elongate longitudinally as the lever 16 rotates through its over-center position without the application of an excessive amount of force. The recovery characteristics of the elastomeric material should be such that the latch body 18 will retain its shape for a prolonged period of use and also such that a sufficient tensile stress is created in the latch body 18 when the latch is closed to secure the closure members together while also permitting relative movement between the closure members due to vibrations or other forces. In addition, the elastomeric material must be flexible enough to compensate for misalignment of the base and keeper in order to fully achieve the objects of the present invention.

Moreover, it is advantageous from a manufacturing standpoint to use an elastomeric material which is inexpensive and which can readily be used in common manufacturing techniques, such as injection molding and the like. Furthermore, in those instances when the present invention will be used on machinery and other such applications where it will be exposed to the elements, the elastomeric material should be resistant to degradation by ultraviolet light, rain, etc. as well as a variety of chemical reactants. It is also advantageous, particularly in external applications, for the elastomeric material to retain its stretch and recovery characteristics over a wide range of temperatures and should also be resistant to heat aging, such as EDPM rubber and silicon. From an aesthetic standpoint, the elastomeric material should be resistant to cracking and fading and further should be available in a variety of colors.

As indicated earlier, when the latch 10 is being engaged, and the latch body 18 is being stretched, a spring force is generated due to the elastic properties of latch body 18 and this force is transmitted through the base 14 and lever 16. In accordance with the present embodiment, the force is transmitted through to the base 14 and lever 16 by two methods. The first method is via the pin members 58 and the second method is via the two surfaces 60 of each of the end portions of the latch body 18. Specifically, as the latch body 18 is stretched, the generally cylindrical surfaces 60 become stretched and generally oval in configuration, with the internal edges of which bearing upon the inner surfaces of the cavities 50 and 52 which comprise the front walls 48 and 52 of the base 14 and lever 16, respectively.

Figure 6:
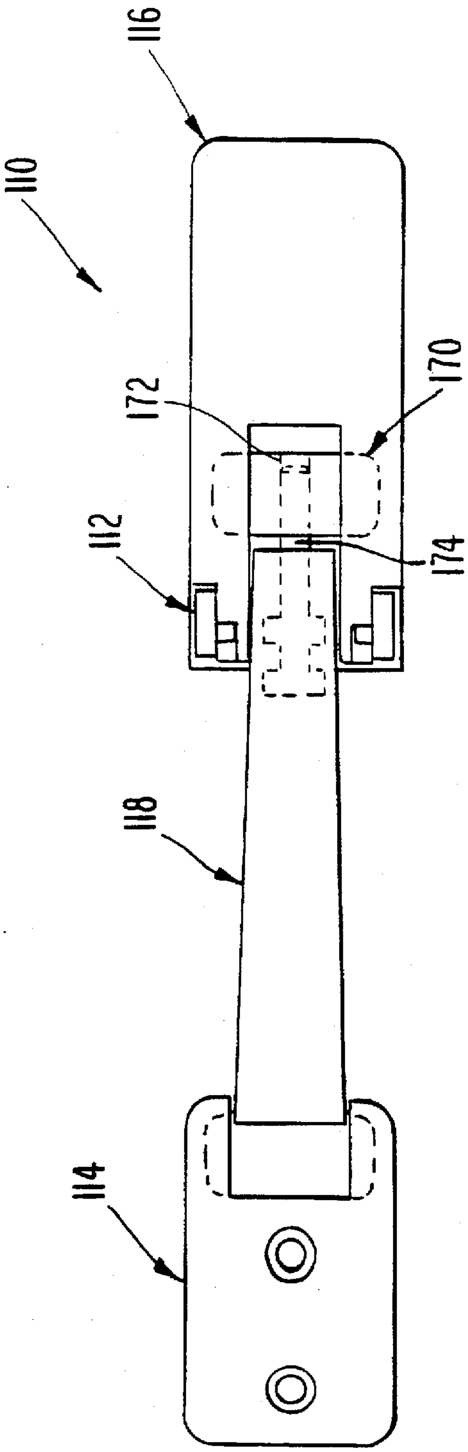
FIG. 6 is a top plan view of a latch according to an alternate embodiment of the present invention and shown in a closed and latched position.
Figure 7:
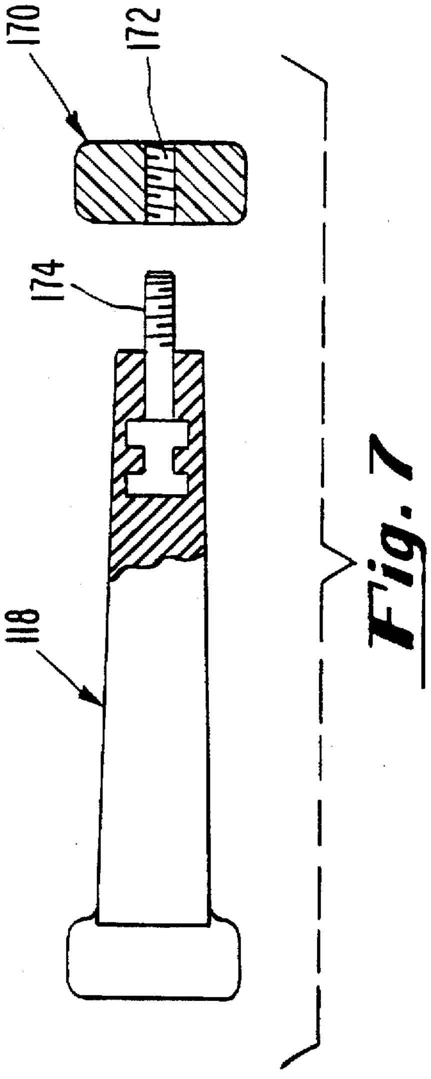
FIG. 7 is an exploded partly sectional view of the latch of FIG. 6 illustrating a latch body and adjustable tension mechanism.

In FIGS. 6 and 7 is illustrated an alternate embodiment of the flexible draw latch of the present invention. In the present embodiment, the portions corresponding to the portions described in relation to the flexible draw latch 10 are described using the same number designations except beginning with the number 100. Accordingly, the flexible draw latch 110 includes as its portions a keeper 112 [only a portion of which is shown] and a latch assembly comprising a base 114, a lever 116, and a substantial elastic latch body 118. Further, in order to simplify the description herein, only the portions which are different from that in relation to the flexible draw latch 10 will now be described. The flexible draw latch 110 as illustrated includes adjustment means for varying a length of the latch body 118. For this purpose, the latched body 118 includes a middle portion generally elongated along a longitudinal axis, and a pair of generally elongated end portions which are substantially perpendicular to the longitudinal axis of the middle portion similar to that of the latch 10. As best illustrated in the exploded view of FIG. 7, one of the generally elongated end portions 170 of the latch body is formed having a threaded channel 172 therethrough, and a threaded member 174 is provided extending from the middle portion of the latch body 118 along its longitudinal axis. In this embodiment, preferably the threaded member 174 comprises a threaded stud which is mounted within the elastomeric latch body 118, and the corresponding generally elongated end portion 170 into which the screw member 174 is received is preferably comprised of nylon, however other suitable materials can be used. Further, preferably, the end portion 170 also serves as the pin member for providing connection to the lever 116, similar to that described in relation to the latch 10. Similarly, in this embodiment, the end portion 170 although not shown is seated within opposing apertures provided in the side walls of the lever 116, and on assembly is mounted through one side of the lever 116. In order to accomplish adjustment of the latch body 118, the lever 116 is either rotated clockwise or counterclockwise depending on whether it is desired to increase or decrease the length of the latch body 118. The remaining operation of the device is similar to that of the latch 10.

Other variations although not shown are possible in order to accomplish adjustment of the length of the latch body. In particular, instead of the end portion 170 being attached to the lever 116, the end portion 170 can also be connected with the base 116, which in effect is a reversal of that above described. In addition, the threaded member 174 can be provided on the end portion 170 and the threaded channel 172 can be provided in the middle portion of the latch body 118. Alternatively, the latch body 118 can be of the same type earlier described in relation to the latch 10, in particular having two elastomeric end portions connected with the middle portion, and the adjusting mechanism being provided solely within the middle portion of the latch. Specifically, the middle portion of the latch would be comprised of two portions, with the screw member being formed within the first portion and the screw threads being formed within the second portion. In this manner, adjustment would be accomplished in the same manner as that earlier described.

Based on the foregoing description of the various embodiments of the present invention, it should be understood that there are several advantages provided. One particular advantage is that a single pin can both securely attach the latch body to the remaining portions of the device and also function as the pivot point for the latch body relative to the base and lever. Particularly, the configuration that the ends of the pin are larger in diameter than the aperture through the latch body insures that the pin will remain in the latch body after it is assembled. Specifically, in order for the pin to be removed from the latch body, one of the large diameter ends must be forced through the latch body with great effort and since there are no forces acting in this manner during latching operation the pin is retained within the latch body aperture: in particular, during latching operation, the forces acting on the latch are perpendicular to the direction which is required for the pin to be removed. Furthermore, the pin in also serving as the pivot point for the latch body serves to provide an even further secure connection for the device. Furthermore, the pin can easily and quickly be installed. In addition, another advantage is that the inside walls of the larger diameter ends of the pin bear against the end portions of the latch body. Furthermore, the configuration of the base and lever and the manner in which the latch body is seated within these portions also works to retain the connection of these members. Specifically, the portions of the front and top walls of the base and lever surround the end portions of the latch body in order to retain the position of these members. As indicated earlier, one known problem that occurs in prior art devices is where the latch body splits open proximate the back side of one of the apertures, and due to the configuration of the present invention, the latch body will remain connected with the base or lever in this situation.

Another advantage provided by the latch of the present invention is that the forces generated by the latch body are transmitted through the base and lever by two methods, which reduces the amount of stress on any one portion of the device. Specifically, the primary method of transmitting the force from the latch body is via the pin member, which is connected with the base and lever by its end portions. The secondary method of transmitting the force is via the engagement of the latch body with the base and lever; in particular, the engagement between the opposing surfaces of the end portions of the latch body with the two inner surfaces of the cavities within the front walls in the base and lever. As indicated earlier, as the latch body is stretched the cylindrical end portions stretch to form an oval, and the internal edges of which proximate the front walls come to bear on the two interior wall surfaces of the base or lever.

Still another advantage is that the interaction of the catch member on the keeper with the connecting wall of the lever provides for a more secure latching engagement for the device. For instance, the engagement of the catch member and connecting wall will operate to retain the device in the latched position even in instances where failure occurs at the point of contact between the opposing channels in the walls of the lever with the bosses of the keeper. Another advantage is that an audible tone is produced which is an indication when the latch is secured. In addition, the particular positioning of the catch member and the connecting wall also provides for an even more secure latching engagement. Specifically, when the lever is moved into the latched position, neither the catch nor the connecting wall is exposed, but rather is enveloped and concealed, and thus protected by the lever. This occurs because both the length of the catch member along its longitudinal axis is less than the distance between the opposing side walls of the lever, and the diameter of the catch member transverse its longitudinal axis is less than the distance of the top wall along the longitudinal axis of the lever. However, if the catch and connecting wall were exposed, it would be possible for the lever to become unlatched due to inadvertent contact with the exposed portions. Further, another advantage in the design of the present invention is that there are no additional parts which need to be provided.

Still another advantage of the present invention is that an adjustment mechanism can also be provided in order to vary the tension of the elastic latch body. The advantage here is that the latch can be used in a greater number of applications and also is easier to operate since repositioning of the keeper relative to the base would not be required in order to adjust the tension.

In addition, another advantage of the present invention is that it can be easily incorporated into existing designs and at minimal additional cost. Another benefit is that the characteristics of other prior art flexible latching systems are still present in the instant draw latch under normal conditions, such as including the ability to flex, absorb misalignment, and absorb vibration.

It will be recognized by those skilled in the art that changes may be made by the above-described embodiments of the invention without departing from the broad inventive concepts thereof. For instance, while the base, lever and keeper are all preferably of a plastic molded construction, it should be understood that these components can be manufactured by other techniques and from other suitable materials. Similarly, the latch body can be manufactured of a variety of materials and techniques. It is understood, therefore, that this invention is not limited to the particular embodiments disclosed, but it is intended to cover all modifications which are within the scope and spirit of the invention as defined by the appended claims.

I claim:

1. A method of installing a pivot pin in a latch adapted for use in securing together a first closure member and a second closure member, the latch comprising:

a keeper adapted for being affixed to the first closure member; and a latch assembly, the latch assembly comprising:

a base adapted for being affixed to the second closure member;

a substantially elastic latch body pivotally connected to the base, the latch body including two opposing surfaces at spaced separation defining a width of the latch body;

a lever pivotally connected to the latch body adapted for engaging the keeper, the lever being adapted to pivot from an open to a closed position when engaging the keeper for latching together the first and second closure members;

a pair of generally elongated attachment members for pivotally connecting the substantially elastic latch body to the base and to the lever, the latch body including a pair of apertures extending the width thereof for receiving said pair of generally elongated attachment members, wherein at least one of the pair of generally elongated attachment members comprises a pin member, wherein said pin member is generally elongated an amount greater than the width of the latch body and includes first and second areas of specified diameters proximate opposing ends thereof and a third area between and of a diameter less than that of the first and second areas, wherein at least one of said apertures through the latch body into which the pin member is received comprises a pin member aperture, wherein said pin member aperture is of a diameter less than that of the diameters of the first and second areas of the pin member, with the third area of the pin member being positioned within the pin member aperture through the latch body and the first and second areas being positioned outside of the pin member aperture and adjacent the two opposing surfaces thereof, the method comprising the steps of:

inserting a first end of said pin member within a first end of said pin member aperture in the latch body, wherein said first area of said pin member is proximate said first end; and press fitting said pin member through said pin member aperture, wherein as said first area proximate said first end of said pin member passes through said pin member aperture, said diameter of said pin member aperture expands by said diameter of said first area of said pin member, wherein when said first area of said pin member is passed through said pin member aperture, said diameter of said pin member aperture decreases when said third portion of said pin member is positioned within said pin member aperture of said latch body.

2. A method according to claim 1, wherein said base and said lever each include a pair of spaced apart side walls including an aperture therein defining supporting surfaces for seating of substantially said first and second areas of said pin member, wherein the method further includes the steps of:

inserting said first end of said pin member initially through the aperture in the first side wall of the base or the lever and then into the pin member aperture; and press fitting said pin member through the pin member aperture so that the first area of the pin member is seated substantially within the aperture in the second side wall and the second area of the pin member is seated substantially within the aperture in the first side wall of the base or the lever.

* * * * *